Figure 3:
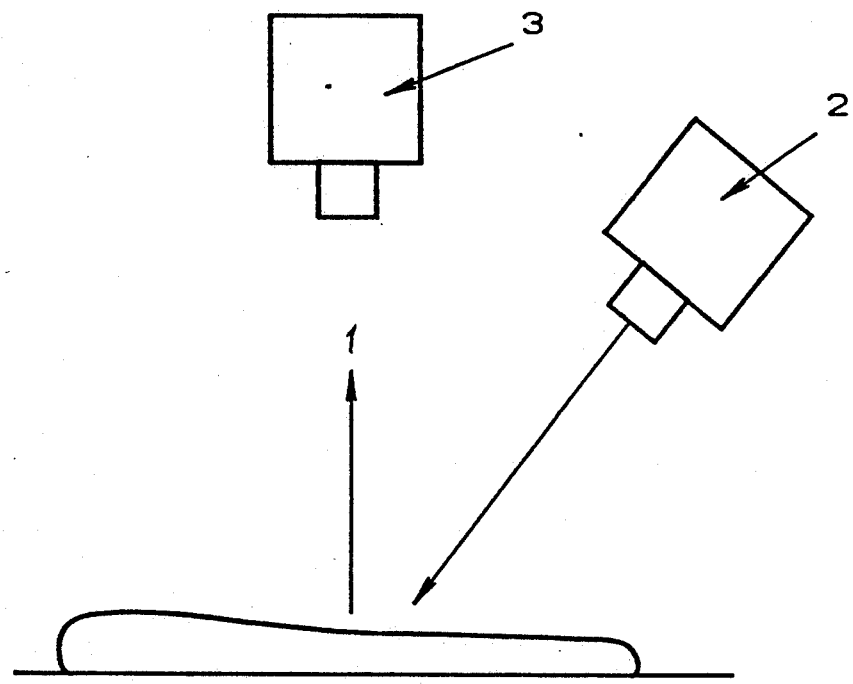

United States Patent [19]

Haagensen

[11] Patent Number: 5,241,365
[45] Date of Patent: Aug. 31, 1993

[54] METHOD OF AREA LOCALIZATION OF MEAT, IN PARTICULAR FISH, WHICH IS INITIALLY SUBJECTED TO ILLUMINATION

[75] Inventor: Peter Haagensen, Valby, Denmark

[73] Assignee: Lumetech A/S, Copenhagen, Denmark

[21] Appl. No.: 623,987

[22] PCT Filed: Jun. 22, 1989

[86] PCT No.: PCT/DK89/00156
§ 371 Date: Dec. 21, 1990
§ 102(e) Date: Dec. 21, 1990

[87] PCT Pub. No.: WO89/12397
PCT Pub. Date: Dec. 28, 1989

[30] Foreign Application Priority Data

Jun. 23, 1988 [DK] Denmark .................. 3440/88

[51] Int. Cl.$^5$ .................................. A22C 25/00
[52] U.S. Cl. ........................................ 356/376
[58] Field of Search ............... 356/376; 452/157, 158

[56] References Cited

U.S. PATENT DOCUMENTS 3,216,311 11/1965 Bibbero.
3,800,363 4/1974 Lapeyre.
4,226,540 10/1980 Barten et al.
4,557,019 12/1985 VanDevanter et al. ........... 452/157
4,726,094 2/1988 Braeger.
4,748,724 6/1988 Lapeyre et al.
4,875,254 10/1989 Rudy et al.
4,908,703 3/1990 Jensen et al. ..................... 356/237
4,962,568 10/1990 Rudy et al.

OTHER PUBLICATIONS

Will, P. M., "Optical Encoding of 3-Dimensional Objects", *IBM Technical Disclosure Bulletin*, vol. 16, No. 9 (Feb. 1974) pp. 3117-3118.

*Primary Examiner*—Richard A. Rosenberger
*Attorney, Agent, or Firm*—Ladas & Parry

[57] ABSTRACT

A method of area localization of a piece of meat, in particular fish, which is initially subjected to illumination. To perform automated localization of the exact position of various occurrences as well as meat texture, the piece of meat is illuminated in a predetermined pattern to provide contour information, which is recorded in a direction different from the illumination direction, said contour information being then used for providing additional information on the nature and the exact position of occurrences within the contour of the piece of meat.

6 Claims, 2 Drawing Sheets

Fig 1
Fig 2
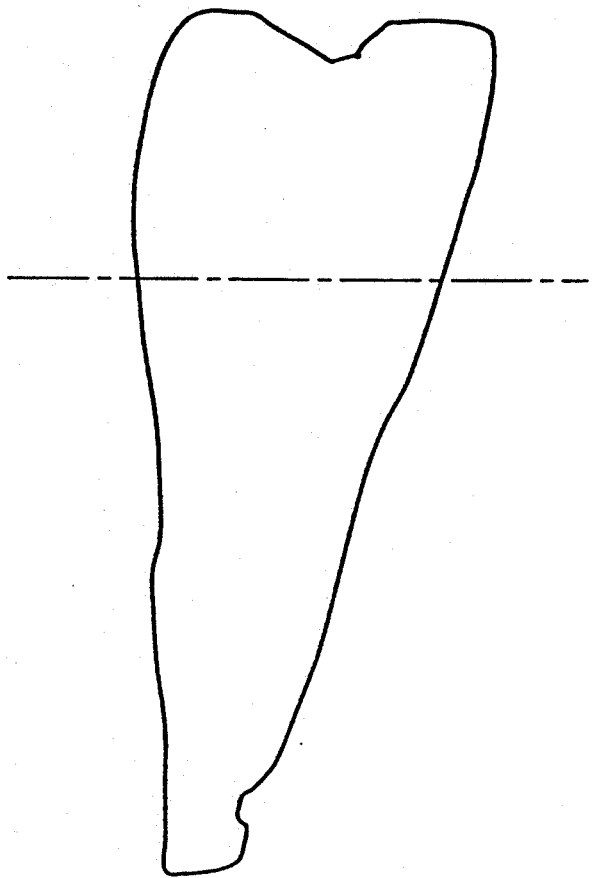
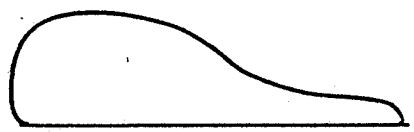

METHOD OF AREA LOCALIZATION OF MEAT, IN PARTICULAR FISH, WHICH IS INITIALLY SUBJECTED TO ILLUMINATION

The invention concerns a method of area localization of meat, in particular fish, which is initially subjected to illumination.

Various illumination techniques are known in connection with determination of the quality of meat products, where illumination of such meat products by means of a special device provides profile information on the surface nature of the products, or so-called texture, via contrast occurrences, where localization proper of defects can e.g. be performed by means of a UV recording in another optical system.

These previous techniques have thus been based on examination and control measures concerning meat fillets in particular of a boneless type. Yet the techniques have not been able to ensure to a sufficient degree that the sliced fillets have been completely free of bone occurrences while maintaining an optimum meat amount, so these known techniques are not suitable for the special localization accuracy which is required in connection with correct boning and removal of impurities and the like.

Alternatively, both image recordings might be provided in a combined system, the fillet being initially irradiated with infrared and/or visible light in connection with being irradiated with ultra-violet light. The image thus produced therefore gives information on both the surface characteristics and the undesired occurrences.

The object of the invention is to provide a method wherein it is possible, in determined areas of in particular fish, to perform automatic localization of the exact position of occurrences, such as e.g. bones, impurities, fins, as well as optionally the texture in general, and so that the fillets can subsequently be subjected to very careful, automated processing optionally in the form of cutting and slicing in the areas in question. With further boning it is thus possible to obtain a completely clean and boneless fillet in this manner while maintaining the greatest possible amount of meat.

This object is obtained by the method according to the invention where a fish fillet is initially subjected to illumination in a predetermined pattern. On a flat surface this pattern will consist of lines and provide a segmented surface characteristic of the fillet. The light characteristic thus produced, when recording an image in a direction different from the illumination direction, produces unambiguous information on the profile variations of the object, but also on the nature of the texture.

This information about profile and texture entails that subsequently the detection of undesirable occurrences can be concentrated to the characteristic sub-areas of the object produced via the illumination.

The resulting additional information is then used for focusing on areas of the object in which the undesired occurrences are disposed. In the sub-areas thus encircled, it is now possible to determine the shape and type of the fillet and to localize the thick and thin areas, the bones, impurities and texture in general of the fillet, via contrast formations in the profile information.

The actual detection of various occurrences in or on the fillet may advantageously be provided by means of the sequence of the profile lines, e.g. angular measurements of curve tangents to the fish profile so that areas having determined curve shapes are used for indicating the location of various impurities, it being possible to perform calculations of this type for each light streak or profile in the transverse direction of the fish.

In connection with additional strengthening of the area localization it is possible to combine the profile information provided via the initial illumination with statistical data for the fish type in question. These statistical data give the system instructions concerning the approximate location of the characteristic sub-areas, known by experience, of the individual type of fish.

It will thus be appreciated that the use of statistical data for preceding definition of the characteristic areas of the fish will have importance in connection with the processing accuracy and speed obtainable in a fish cleaning plant, where said methods are used in connection with subsequent stations for cutting, slicing and boning.

When the additional information provided on the basis of the profile information modifies the search of profile information away from the trivial areas so that this is increased in the given, characteristic areas, knowledge on the characteristic sub-areas is obtained more rapidly and with greater certainty where even occurrences insignificant in terms of area, so-called ray bones and black membranes, can be detected. These occurrences are extremely difficult to distinguish without a relatively careful search of the profile information.

As will be appreciated from the foregoing, the method of the invention is based on the wish for a completely automated processing line, where treatment stations for the actual boning are already mechanized today, while the so-called trimming, for which the area localization of the invention forms the groundwork, takes place manually. Of course, this involves a relatively great consumption of time, and moreover not all undesirable occurrences are localized and removed with certainty.

Figure 4:
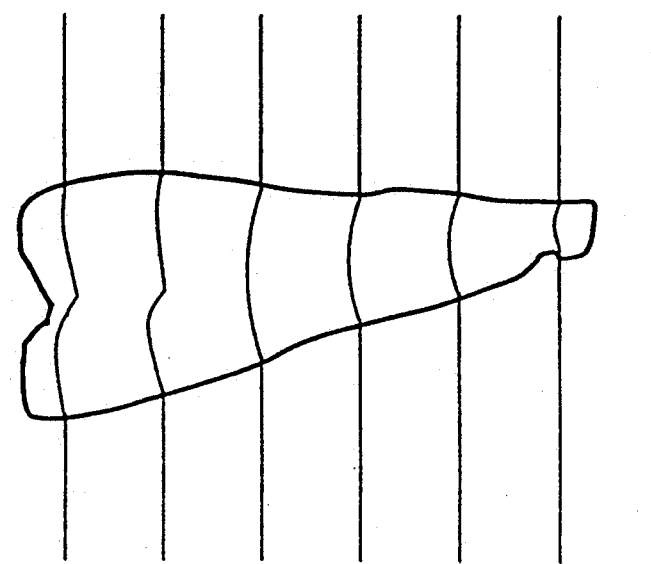

The invention will be explained more fully below with reference to the drawing, in which FIGS. 1 and 2 are a top view and a side view, respectively, of a fish fillet, FIG. 3 is a cross-sectional view of the fish fillet illustrated in FIGS. 1 and 2, from which it appears how the fish fillet is subjected to illumination and an image is recorded, and FIG. 4 shows the profile information of an illuminated fish fillet.

FIGS. 1-3 show an example of a fish fillet 1 and are to illustrate how such a fillet may have an irregular surface extent and rim contour, of which in particular FIGS. 2 and 3 show how the meat thickness may vary over the fish fillet. It will be appreciated that for various types of fish close connection exists between the meat occurrences, i.e. thickness, surface extent, location of bones, fins, impurities and other matter.

FIG. 3 also shows how in a first step of the detection process the fish fillet is subjected to illumination which is here provided in the form of a plurality of arranged lines of light transversely to the longitudinal direction of the fillet. The illumination is here made by means of a light source 2 which emits light directed obliquely to the supporting plane of the fillet, which, after illumination, is subjected to image recording with a camera 3 placed perpendicularly above the fillet. It will be appreciated that when recording an image in a direction different from the direction of illumination, the streaks of light will display a surface profile of the fillet showing its thick and thin areas, etc. This profile information appears from FIG. 4.

The resulting graph drawing will thus immediately segment the fish fillet so as to provide knowledge on the profile spatial nature of the fillet and thus knowledge on characteristic sub-areas.

This profile information thus forms the basis for the actual search of the various occurrences of the fillet, which may be provided by various techniques. Of course, various types of fish have various locations of occurrences of a more or less undesirable nature, it being appreciated that this advance knowledge about such circumstances can advantageously be utilized in the form of a sort of statistical data for the fish type in question. These statistical data can therefore be added to the system in the form of instructions concerning the location of the characteristic sub-areas, known by experience, of the individual type of fish, and these instructions may be combined with the actual search on the basis of the above-mentioned graph drawing. Accordingly, this additional information may be used for controlling the search of profile information towards the areas where impurities probably occur.

It will therefore be appreciated that the use of these statistical data for preceding definition of the characteristic area of the fish in combination with the profile information will have importance in connection with the processing accuracy and speed which can be obtained in a fish cleaning plant. The actual search can therefore be established by means of the angular measurements between curve tangents to the fish profile (see FIG. 3) mentioned initially, where the areas with determined angular relations indicate that e.g. a fish bone is present in the area immediately below these.

The information gathered hereby gives a set of data for the further processing of the fillet in subsequent stations so as to ensure correct cutting amounts, sliced lengths and sequence of slicing for the sub-areas of the individual fish. It is obtained in this manner that the fish fillets are examined and processed individually, thereby improving the overall product quality in a fish cleaning plant significantly.

I claim:

1. A method of area localization of a piece of meat, comprising the steps of illuminating the piece of meat with a source of light above the meat to project a predetermined light pattern of lines across a face of the meat, the pattern of lines being transverse to a longitudinal axis of the meat; and recording an image of the entire light pattern formed across the piece of meat, in a direction different from a direction of illumination, to provide visual information concerning the profile of the entire piece of meat, based on the deviation of the projected lines from linearity, so that the visual information is used to determine the nature and the exact location of occurrences within the piece of meat.

2. A method according to claim 1, wherein the nature and exact location of occurrences within the piece of meat are determined from the recorded image on the basis of angular relations between a plurality of tangents to a curve which represent the profile of the meat at a given point.

3. A method according to claim 1, wherein the visual information concerning the profile of the meat is utilized to search the meat further in areas likely to have occurrences.

4. A method according to claim 1, wherein the meat is a fish fillet.

5. A method according to claim 1, further comprising the step of positioning the source of light at an angle with respect to the face of the meat and recording the image of the light pattern formed on the piece meat in a camera that is positioned perpendicular to the face of the meat.

6. A method of area localization of a piece of meat, comprising the steps of:

illuminating the piece of meat with a source of light above the meat to project a predetermined light pattern of lines across a face of the meat, the pattern of lines being transverse to a longitudinal axis of the meat;

recording an image of the entire light pattern formed across the piece of meat, in a direction different from a direction of illumination, to provide visual information concerning the profile of the entire piece of meat, based on the deviation of the projected lines from linearity; and controlling the search of the profile information by using empirical statistical data concerning the location of occurrences, for that particular type of meat, so that the visual information is used to determine the nature and the exact location of occurrences within the piece of meat.

* * * * *